United States Patent [19]

Lin

[11] 3,800,317

[45] Mar. 26, 1974

[54] SERVO SYSTEM AND METHOD FOR POSITIONING AN ELEMENT AT PRECISELY SPACED POSITIONS

[75] Inventor: Frank W. Lin, San Jose, Calif.

[73] Assignee: Caelus Memories, Inc., San Jose, Calif.

[22] Filed: July 31, 1972

[21] Appl. No.: 276,423

[52] U.S. Cl. .......... 360/78, 324/71

[51] Int. Cl. .......... G11b 5/52

[58] Field of Search ...... 318/640, 653, 686; 324/71; 340/174.1 C

[56] References Cited

UNITED STATES PATENTS

| | | | |
|---|---|---|---|
| 3,491,347 | 1/1970 | Farrand | 340/174.1 C |
| 3,200,385 | 8/1965 | Welsh | 340/174.1 C |
| 3,449,735 | 1/1969 | Coger | 340/174.1 C |
| 3,716,845 | 2/1973 | Chaffin | 340/174.1 C |
| 3,699,555 | 12/1972 | Du Vell | 340/174.1 C |

*Primary Examiner*—Vincent P. Canney

*Attorney, Agent, or Firm*—Lindenberg, Freilich & Wasserman

[57] ABSTRACT

A positioning servo system is disclosed, the function of which is to control the sequential positioning of an element at each of a plurality of defined positions, accurately spaced from one another, even though at each defined position the element's position may deviate therefrom. The system includes a device, such as a laser interferometer, which produces a pulse for each known distance of travel of the element, such as a magnetic head. The system includes a main up-down counter which is reset to contain a selected number or count when the head is at a reference first position. The selected number is related to the number of pulses which the device produces when the head is moved a distance precisely equal to the distance between the first position and a second position at which the head is to be positioned. As the head is moved to the second position, the pulses from the laser interferometer change the count in the main counter. When the count reaches a known value a track pulse is produced, indicating the arrival at the second position. The track pulse causes the main counter to be reset to a count which is a function of the precise distance from the second position to a third position. Also, the track pulse activates an error generator to generate an error signal which is used to servo the head so as to minimize the deviation of its actual position from the second position. As the servoing takes place pulses are produced which affect the count in the main counter. Consequently, when the head is moved to the third position, a track pulse is produced when the head is precisely at the desired distance from the second position.

24 Claims, 9 Drawing Figures

SERVO SYSTEM AND METHOD FOR POSITIONING AN ELEMENT AT PRECISELY SPACED POSITIONS

BACKGROUND OF THE INVENTION

1. Field of the Invention

The present invention generally relates to a positioning servo system and, more particularly to a system for the positioning of an element at each of a plurality of positions, based on the precise distances between positions.

2. Description of the Prior Art

The present trend in data storage systems of the type employing magnetic drums or disc-files is to increase the aerial density of the data. This is achieved by decreasing track width to enable more tracks to be recorded on a given area. As track width is decreased the spacing between centers of adjacent tracks decreases. Consequently, the problem of positioning a magnetic transducer next to a particular selected track without subjecting the transducer to cross-feed from data in adjacent tracks increases in complexity.

In U.S. Pat. No. 3,534,344 a system is described for producing a servo-disc with closely spaced servo tracks. The servo disc which is incorporated in a disc-file with data discs is used to enable a servo transducer to locate the path between a pair of adjacent servo tracks which is at a selected precise radial distance with the disc's center and thereby enable a data transducer located adjacent a data-disc to be positioned at the same precise radial distance. For the servo disc to serve its intended function, the center of the various servo tracks must be spaced at very precise distances from one another so that the paths which adjacent servo tracks define are at very precise radial distances from the center of the disc. Since the number of tracks on the disc is quite large, e.g., about 400, and the track width is very small, e.g., 5 m. inches (m.i.) no cumulative errors in the locations of the centers of the tracks can be tolerated when successively recording the various tracks.

Attempts to produce an acceptable servo disc by controlling the servo head position with prior art closed-loop servo systems have not been successful. The reason for the failure is primarily due to the fact that when recording a track the head position varies slightly about the absolute position of the track center. Consequently, when moving the head to the center of the next track, since the head may not have been located exactly at the center of the previous track, it is hard to locate the center of the next track which must be at a precise distance from the center of the previous track.

Furthermore, in prior art closed-loop servo systems, an optical detent in the form of masked glass slides is used. The accuracy of each of a plurality of positions is determined by the absolute position of the masks and the capability of the photoelectric circuit to detect the position of the masks. Although no cumulative errors exist in these systems where each of a plurality of positions is physically defined, the accuracy of the masks is limited by the difficulty in their fabrication process. Also these systems are only capable of positioning an element at the discrete positions defined by the locations of the masks which are in the order of milli-inches.

Therefore, a need exists for a system which is capable of moving a head located at one position to another position which at a precisely known distance from the preceeding position, even though at each position the head is free to move about the position. Generally stated a need exists for a system capable of sequentially positioning an element at each of a plurality of defined positions, based on the precise distances between positions, even though at each defined position the element's position is free to vary with respect thereto.

OBJECTS AND SUMMARY OF THE INVENTION

It is a primary object of the present invention to provide a new positioning servo system.

Another object of the present invention is to provide a servo system which is capable of moving an element whose position is variable about a first defined position to a second defined position which is at a fixed precise distance from said first defined position.

A further object of the present invention is to provide a system to control the sequential positioning of an element at each of a plurality of defined positions along a line based on the absolute distances between adjacent positions and the actual positions of the element with respect to said defined positions.

Yet a further object of the invention is to provide a novel method to control the sequential positioning of an element at each of a plurality of defined positions along a line based on the absolute distances between adjacent positions and the actual positions of the element with respect to said defined positions.

These and other objects of the present invention are achieved by a system which defines a first position of the element as a reference position and concurrently therewith responds to the known fixed distance between the reference position and a succeeding position at which the element is to be positioned. Any deviation of the element from the first position is sensed by the system, so that when it commands the element to move to the second position a control pulse, indicating the arrival of the element at the second position, is produced when the element is precisely at the fixed distance from the first position, rather than the fixed distance from its previous deviated position from the first position.

DETAILED DESCRIPTION OF THE PREFERRED EMBODIMENTS

Figure 1:
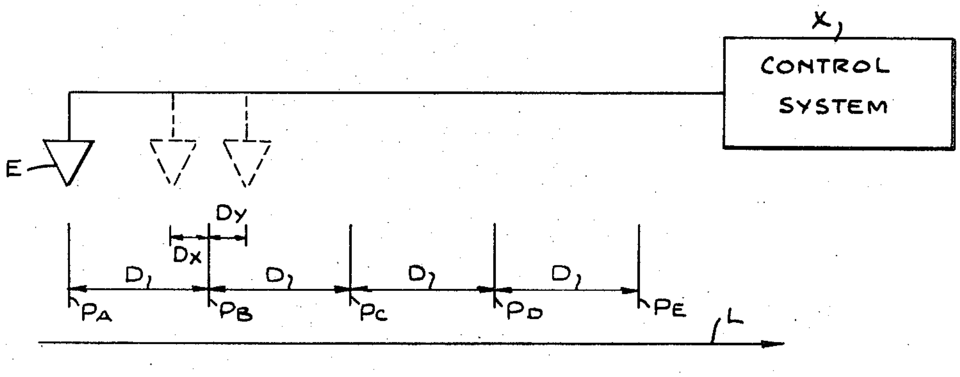
FIG. 1 is a simple diagram useful in explaining the function of the invention.

The basic principles of operation of the present invention may best be explained in connection with FIG. 1 wherein E designates an element which is to be successively positioned at each of a plurality of defined positions $P_A - P_D$ along a line L. The precise distance between adjacent positions is assumed to be equal to D. The element movement is controlled by a control system X. The system X is capable of generating pulses as a function of the distance traversed by element E and the direction of motion. It produces a right pulse each time the element moves a known distance to the right and a left pulse every time the element moves to the left the same known distance. Assuming that the known distance is D/100 as the element moves a distance D,100 pulses are produced.

In operation one of the defined positions such as $P_A$ is used as a reference position by controlling the element to be positioned precisely at $P_A$. The system includes a main up-down counter. As soon as element E is positioned at $P_A$ the counter is reset to a count of 100, representing the distance D from $P_A$ to $P_B$. Thereafter, any deviation of element E from $P_A$ is reflected by a change in the count in the main counter which is assumed to count up by one in response to each left pulse. Let it be assumed that when the count in the counter is exactly 100, i.e., E is exactly at $P_A$ the system starts moving the element toward $P_B$. This is achieved by supplying an appropriate voltage, e.g., a positive voltage, to a servo motor which moves element E toward $P_B$.

As E moves to the right, right pulses are sequentially produced. They decrement the count in the main counter. Since a count of 100 was landed in the main counter when E was at $P_A$, the count reaches zero at the instant the element is at $P_B$. At this instant several steps are performed. The counter generates a control pulse which indicates the arrival at $P_B$. The main counter is immediately reset by the control pulse to a count corresponding to the distance from $P_B$ to the next defined position $P_C$. Since in this example the distance is D, the main counter is reset to 100. Also, in response to the control pulse the supply of the positive voltage to the servo motor is terminated. However, due to the systems inertia even though the voltage is terminated the element E tends to overshoot position $P_B$ and move farther to the right.

The system includes a detent error generator which includes an error counter and which, like the main counter, responds to the right and left pulses. The function of the error generator is to provide error voltages to return element E to $P_B$ as close as possible within the system's limitations. The magnitude and polarity of error voltages from the error generator are a function of the count in the error counter. For explanatory purposes let it be assumed that when the count is 32, the error voltage is zero, is positive when the count is above 32 and negative when the count is below 32.

The control pulse resets the error counter to 32. Consequently when the element is exactly at $P_B$ the error voltage is zero. However as the element overshoots $P_B$ to the right the right pulses decrement the count in the error counter from 32. Consequently, a negative error voltage is provided which drives the element to the left, and as a result left pulses are produced. They increment the count in the error counter. The count therein is again 32 when element E returns to $P_B$. Any overshoot to the left of $P_B$ produces left pulses which increment the count in the counter above 32. Consequently, a negative error voltage is produced which now drives the element E to the right toward $P_B$, and at the same time right pulses are produced which decrement the count toward 32. It is thus seen that once the element E reaches $P_B$, i.e., the control pulse is produced the error generator takes over to minimize the overshoot of the element from $P_B$, i.e., minimize the deviation of the element's position from $P_B$.

The right and left pulses which are produced as the overshoot is minimized also affect the count of 100 which was loaded into the main counter when $P_B$ was first reached. Consequently, the count therein reflects the absolute distance between the actual element position and $P_C$. Let it be assumed that at a given instant the element E is to the left of $P_B$ a distance $D_x$ corresponding to 10 pulses. Clearly the count in the main counter is therefore $100 + 10 = 110$. Let it further be assumed that at this instant the system commands the element to move to $P_C$. The supply of the error voltage is terminated and the positive voltage is again supplied to the servo motor to move element E to the right. As it moves the right pulses are produced which decrement the count in the main counter. However, since the count therein is 110 it requires 110 pulses to be produced before a second control pulse is produced, indicating the location of $P_C$. That is, the element is moved a distance $D_x + D$ before $P_C$ is reached. However, the distance between $P_B$ and $P_C$ is exactly equal to D. Thus, even though the element is moved a distance greater than D to reach $P_C$ due to the overshoot $D_x$ to the left of $P_B$ the system defines $P_C$ at the exact distance D from $P_B$.

If the element E is at a distance $D_y$ to the right of $P_B$, where $D_y$ corresponds to 6 pulses, it is apparent that the count in the main counter is 100–6=94. Consequently, when the element moves to $P_C$ the control pulse is produced at $P_C$ after the element moves only the distance $D_y$, corresponding to 94 pulses. Again it should be stressed that even though the element moves a distance less than D, the actual distance between $P_B$ and $P_C$ is exactly D.

When the control pulse is produced at $P_C$ the main counter is again reset with a number corresponding to the distance between $P_C$ and $P_D$ and the process is repeated. From the foregoing it is thus seen that with the present invention an element is positionable at each of a succession of defined positions where the distance between successive positions is accurately controlled even though at each position the element's position is free to vary therefrom.

Figure 3:
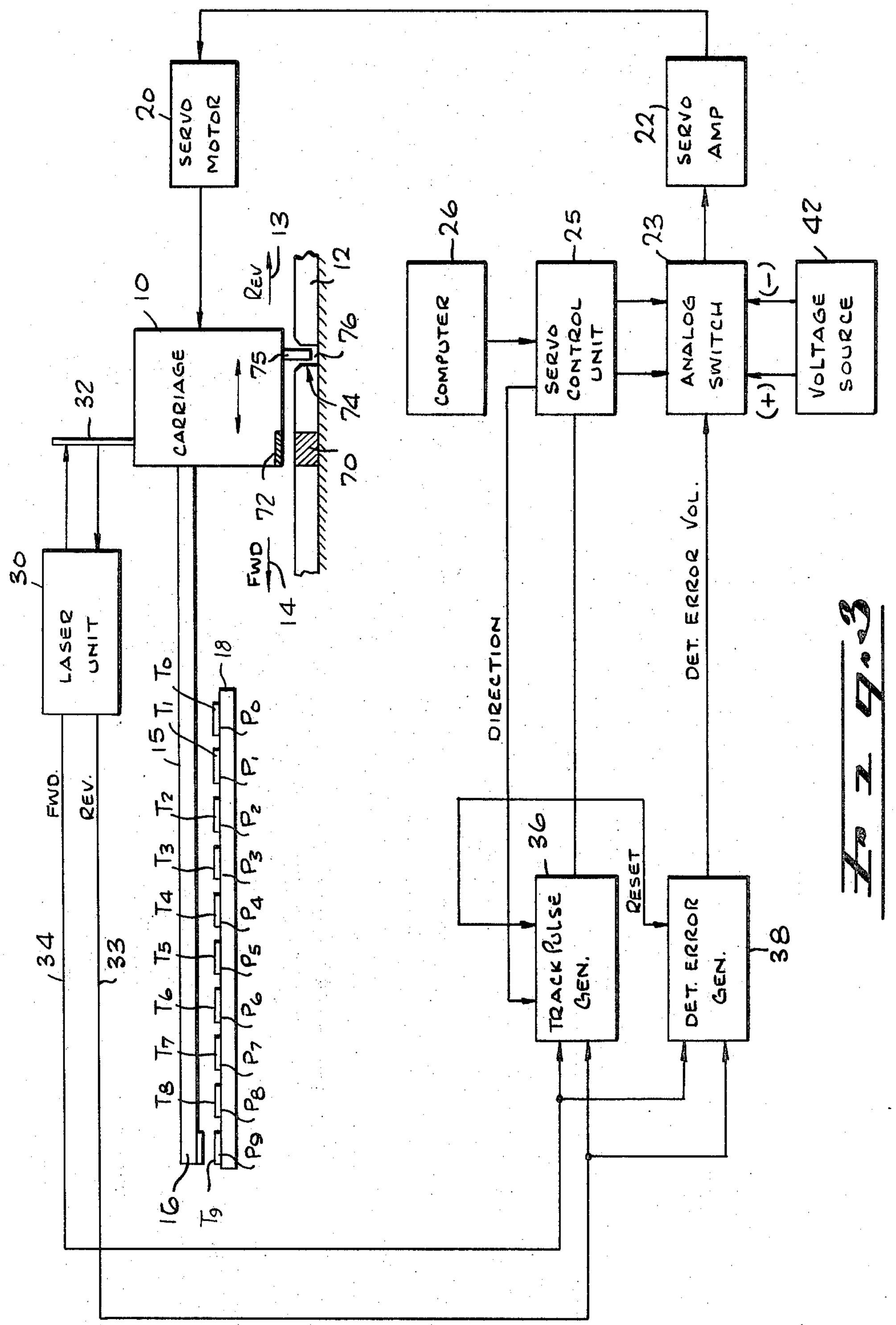
FIG. 3 is a general block diagram of one embodiment of the invention.

Attention is now directed to FIG. 3 in connection with which an embodiment of the present invention will be described. In FIG. 3 numeral 10 designates a carriage frictionlessly movable on a support 12. The carriage is movable in either direction as designated by arrows 13 and 14, and which hereafter will be referred to as the reverse (REV) and forward (FWD) directions. Physically connected to carriage 10 by means of arm 15 is a magnetic head 16. The function of the presently described embodiment is to control the precise centering of the head 16 with respect to any one of a plurality of tracks on a member, such as a magnetic disc 18. In FIG. 3 only a portion of the disc with ten adjacent tracks designated T0–T9 are shown. The center of the tracks are designated P0–P9, and these will be referred to as the track positions. The distance between adjacent track portions such as P4 and P3 corresponding to the distance between track centers will be referred to as the track distance.

The carriage 10 is moved by a servo motor 20 which is part of the servo system and which is driven by servo amplifiers 22 which receive appropriate voltages from appropriate sources through an analog switch 23, which is controlled by a control unit 25. The latter is assumed to be associated with a computer 26 the function of which will be described hereafter.

Forming part of the system is a device which is capable of providing pulses as a function of the movement of the carriage 10 in each direction. In FIG. 3 the device comprises a laser unit 30 which directs light to a mirror 32 attached to the carriage and receives light reflected therefrom. The unit 30 acts as distance measuring device so that as the carriage moves a fixed distance in the reverse direction (to the right) a reverse pulse is provided by the laser unit 30 on line 33, and when the carriage moves the fixed distance in the forward direction a forward pulse is provided on line 34. In one particular embodiment a commercially available laser unit is employed. The particular unit provides a pulse for each 6.23 $\mu$ inch of travel of the mirror 32 with respect to the unit. The unit 30 includes a resettable up/down counter which counts the pulses provided by the unit. Thus, at any time the count therein indicates the total distance travelled by carriage 10, and therefore head 16 from a reference position.

As seen from FIG. 3 the lines 33 and 34 are connected to each of a track pulse generator 36 and a detent error generator 38, whose output is a detent error voltage which is supplied to analog switch 23. Of this embodiment, the output of generator 36 is shown supplied to control unit 25. Also included in the system is a voltage source 42 which supplies positive (+) and negative (−) voltages to switch 23. In the present example it is assumed that when the negative voltage is supplied to amplifiers 22 the carriage is driven in the reverse direction, and that it is driven to the left in the forward direction when a positive voltage is supplied to the amplifiers 22.

The operation of the system may best be described with a specific example. Let it be assumed that the track distance i.e., the distance between track positions is 5.2 mil. Since the laser unit provides a pulse for each 6.23 $\mu$ inch of travel distance, when the carriage and head move one track distance, the unit 30 provides 835 pulses. Let it further be assumed that the head is precisely at position P9 and it is desired to move the head one track distance to P8. Position P9 acts as the reference position. Since the desired direction of travel is the reverse direction the computer through unit 25 rests an up/down counter in generator 36 to 835. The up/down counter in generator 36 is connected to lines 33 and 34 so that each reverse pulse on line 33 decrements the count in the counter by one and each forward pulse in line 34 increments the count by one. Then unit 25 controls the analog switch to supply the negative voltage from source 42 to amplifiers 22. As a result, the carriage 10 moves to the right, thereby moving head 16 toward P8.

As each 6.23 $\mu$ in. distance is traversed a reverse pulse is supplied by unit 30 on line 33, thereby decrementing the count in the counter in generator 36. After traversing 5.2 m. in. i.e., when reaching P8 the count in generator 36 is decremented to zero. As a result, a track pulse is provided therefrom. The track pulses again resets the counter in generator 36 to 835 which represents the distance of 5.2 mi. between P8 and P7. The track pulses is also supplied to control unit 25 which controls the switch 23 to terminate the supply of the negative voltage to amplifiers 22 and thereby stop the rightward motion of the carriage 10 and head 16.

Figure 2:
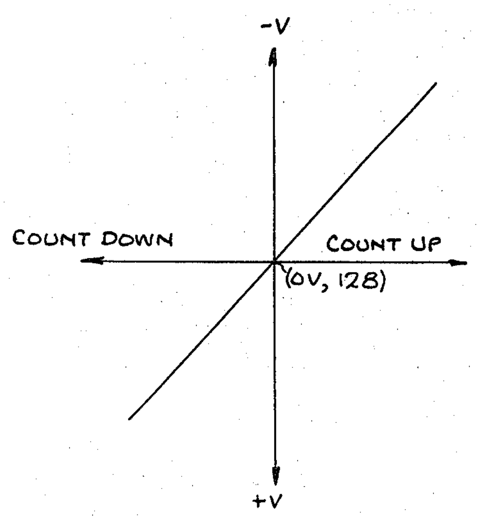
FIG. 2 is a diagram useful in explaining the operation of an error generator, forming part of the system of the invention.

Theoretically the carriage should stop as soon as the supply of the negative voltage is terminated which occurs when head 16 is precisely at P8. However, in practice the head tends to overshoot P8. Consequently, it is necessary to adjust the carriage position to the left. This is achieved in the present system by detent error generator 38. When control unit 25 activates switch 23 to disrupt the supply of the negative voltage to amplifiers 22, at the same time it activates the switch to supply the detent error voltage from generator 38 to the amplifiers 22. Generator 38 is operated to supply an error voltage to the amplifiers to reposition the head 16 at P8. Basically, generator 38 provides a zero detent error voltage when a fixed count e.g., 128 is stored therein. Each forward pulse in line 34 increments the count which causes the generator 38 to provide a negative detent error voltage while each reverse pulse in line 33 decrements the count causing the generator to provide a positive detent error voltage. The count vs. detent error voltage is shown in FIG. 2.

In the present example when the track pulse is supplied by generator 36 when the head reaches P8, the count in generator 38 is reset to 128. Thus its output error voltage is zero. However, due to the overshoot in the reverse direction one or more reverse pulses are provided by the laser unit 30. These decrement the count in generator 38 so that its count is less than 128. Consequently, its detent error voltage is positive, thereby causing motor 20 to drive the carriage 10 and head 16 to the left. As the head moves to the left forward pulses are received which increment the count in generator 38 until it reaches 128. At that instant the error voltage is again zero and the head 16 is precisely at P8. If an overshoot in the forward direction occurs the count increases above 128, due to the forward pulses, causing the generator 38 to provide a negative error voltage which causes the carriage and head to move to the left.

In practice after a track pulses is received and the head positioning is controlled by the error voltages from generator 38, the count therein tends to oscillate above and below 128 and therefore its output voltage changes between positive and negative until the head is at P8 to within a desired accuracy. The positioning error can be minimized by using a sharply sloped detent error voltage and by minimizing mechanical hysteresis. With a reasonably high gain in the servo amplifiers, an accuracy of 10 microinches can be realized.

It should be pointed out that since the track pulse generator is reset to 835 as soon as P8 is reached and a track pulse is provided, the reverse and forward pulses which affect the error generator 38 due to overshoot of P8 also change the count in generator 36 up and down from 835. Consequently when the system commands the head 16 to move to the next position P7 the distance which is traversed is equal to 835 pulses plus or minus the previous error in the position of the head at P8. For example, let it be assumed that head 16 is positioned at P8 to within an accuracy of 10 $\mu$ in. to the right of P8. Consequently, the count in the counter of generator 36 is not 835 but rather 835−2=833, the 2 representing 2 reverse pulses corresponding to a distance of 10 μ in. Therefore, when the system is commanded to move to P7 a track pulse corresponding to P7 is produced after receiving only 833 reverse pulses from the laser unit 30, however, this pulse is produced at a distance corresponding to 835 pulses from P8. On the other hand, if at P8 the head is positioned 10 μ in. to the left of P8, the count in generator 36 is 835+2=837. Consequently, when the system is commanded to move head 16 to P7 the track pulse corresponding to P7 is produced after 837 reverse pulses are received. Thus, the system automatically accounts for the error in positioning the head at one position when producing the track pulse indicating the adjacent position. That is, the next track pulse designating the next track position P7 is not produced after traversing 5.2 m in. from the erroneous position of the head near P8 but rather after 5.2 m in. are traversed from the absolute position of P8.

This aspect is most important if the track distance, i.e., the distance between the centers, of any pair of adjacent tracks must be very precise. In the present invention the distance is fixed by the system, such as by resetting the generator 36 to 835 each time a track pulse corresponding to a track position is produced, rather than by moving the head a track distance from the previous position which may not necessarily be aligned with a track position.

In accordance with the present invention to record information in each of the tracks on the disc, the head is first moved to the most extreme track position, e.g., P9. Upon reaching P9 which acts as the reference track position, the generator 36 is reset to 835 and the information is recorded in T9. While recording the head may move back and forth with respect to P9 within the system's tolerance. However, such motion is registered in generator 36 by incrementing or decrementing the count of 835. Then, when the head is later moved to P8 the track pulse corresponding to P8 occurs when the head is exactly a track distance from reference track position P9 rather than a track distance from the previous head position.

The present invention is not limited to moving the head only in one direction, such as the reverse direction from position to position. It is capable of moving the head in either direction. Assuming that the up/-down counter in generator 36 is of n bits, the generator 36 includes circuitry which resets the counter in response to the track pulse to 835 if the next track position is to the right as herebefore described. However, in addition it is capable of resetting the count to $2^n$−835 if the next position is to the left. Consequently, as the head moves to the left and the forward pulses are received the count is incremented. When the count reaches a full count, i.e., all the *n* bits are 1's, the track pulse is produced indicating the head arrival at the left position. The generator 36 includes logic which provides the track pulse whenever the count in the counter is either zero or a full count.

Figure 4:
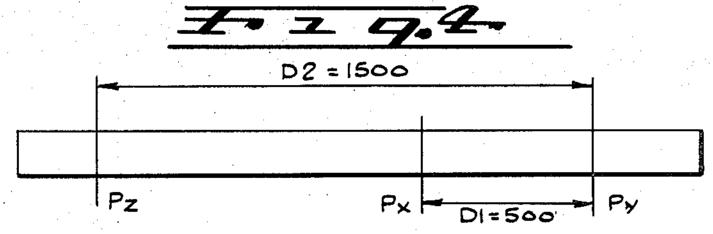
FIGS. 4 and 5 are additional diagrams useful in explaining different aspects of the invention.

The two directional motion capability may best be explained and summarized in connection with FIG. 4. Let it be assumed that it is desired to move the head 16 from a reference track position P*x* first to a track position *Py*, which is to the right of P*x* a distance D1 corresponding to 500 pulses, and thereafter move the head to position P*z* which is to the left of P*y* a distance D2 corresponding to 1500 pulses. Upon establishing P*x* as the reference position under the computer command the counter in generator 36 is reset to 500. Then the computer commands the control unit 25 to control switch 23 to pass the negative voltage to the amplifiers 22. Consequently, the head moves to the left and reverse pulses are provided which decrement the count. When the count reaches zero the track pulse is produced, indicating the arrival at P*y*. It is supplied to the computer via control unit 25 which also activates the switch 23 to supply the error voltage to the amplifiers 22 in order to servo the head to P*y*. When the computer receives the control pulse, indicating that P*y* was reached, since the next position is P*z* to the left of P*y*, it activates the generator to reset the counter to $2^n$ − 1500.

When the function to be performed at P*y* is completed, the control unit is commanded to activate switch 23 to pass the positive voltage from source 42 to amplifiers 22. Consequently, the head is moved to the left and forward pulses are received from laser unit 30. These increment the count in generator 36 so that when the count therein reaches a full count, it indicates the arrival at P*z* by producing the track pulse. Clearly, upon the arrival at P*z* the error voltage is again used to servo the head at P*z* and the computer resets the generator 36 to a count depending on the distance between P*z* and the next position, as well as the direction of travel required to reach the next position from P*z*.

Hereinbefore it was assumed that each track pulse is supplied directly to the control unit which terminates the supply of the voltage (positive or negative) from source 42 to the amplifiers 22 and supplies the error voltage to the amplifiers. Such an arrangement enables the head to be positioned at each of the track positions in the sequence. If desired, the system may be used to control the head to move from a first track position to another track position which is several track distances from the first track position, without stopping at intermediate track position.

Figure 6:
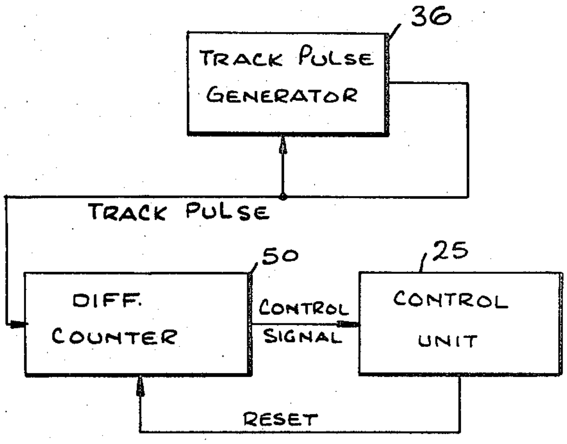
FIG. 6 is a partial block diagram of another embodiment of the invention.
Figure 5:
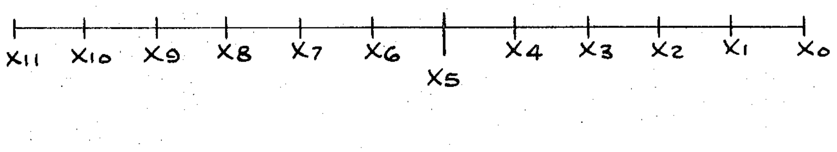

This aspect of the invention may best be explained in connection with FIGS. 5 and 6. In FIG. 5, 12 equally spaced positions X0 through X11 are shown with the track distance between adjacent positions being assumed to correspond to 835 pulses. Let it be assumed that it is desired to move the head from X5, which acts as a reference position, to X11 without stopping at positions X6–X10. In accordance with one embodiment of the present invention, a down counter 50 (see FIG. 6) is connected between generator 36 and control unit 25. This counter is decremented by each track pulse from the generator 36 and it provides a control signal to control unit 25 only when the count therein is zero. The control signal indicates that the head arrived at the desired position. In the present example when X5 is established as the reference position, the counter in generator 36 is reset to $2^n$ − 835, 835 corresponds to the distance between X5 and X6 and the difference counter 50 is set to 6 which corresponds to the number of track distances between X5 and X11. Then, to move the head to X11 the control unit enables switch 23 to supply the positive voltage to the amplifiers.

As the head moves in the forward direction, forward pulses increment the count so that when the count is a full count, it indicates the arrival at X6 and the track pulse is produced by the generator 36. The counter is immediately reset again to $2^n$ − 835 corresponding to the track distance between X6 and X7. The track pulse also decrements difference counter 50 from 6 to 5. However, since its count is not zero, no control signal is provided. Therefore, control unit 25 does not change the state of switch 23 and consequently the positive voltage is continually supplied to the amplifiers 22 to continue driving the head to the left. Each time a track position is arrived at a track pulse is produced resetting the counter again $2^n - 835$ and the difference counter is decremented by one. Only when the head is at X11 is a track pulse produced which also decrements counter 50 from one to zero. Thus, the control signal is provided which activates control unit 25 to in turn activate switch 23 to interrupt the supply of the positive voltage to the amplifiers 22 and supply them with the error voltage from generator 38 in order to servo the head at position X11.

If after X11 the head is to be positioned at X10, upon receiving the control signal at X11, the control unit 25 with the computer cause the generator 36 to be reset to 835. Thus, after the required function is performed at X11, such as reading or recording data in a track centered thereat, when the head is moved to the right and reverse pulses are produced, they decrement the count in generator 36 and a track pulse indicating X10 will be produced when the count will reach zero.

Figure 7:
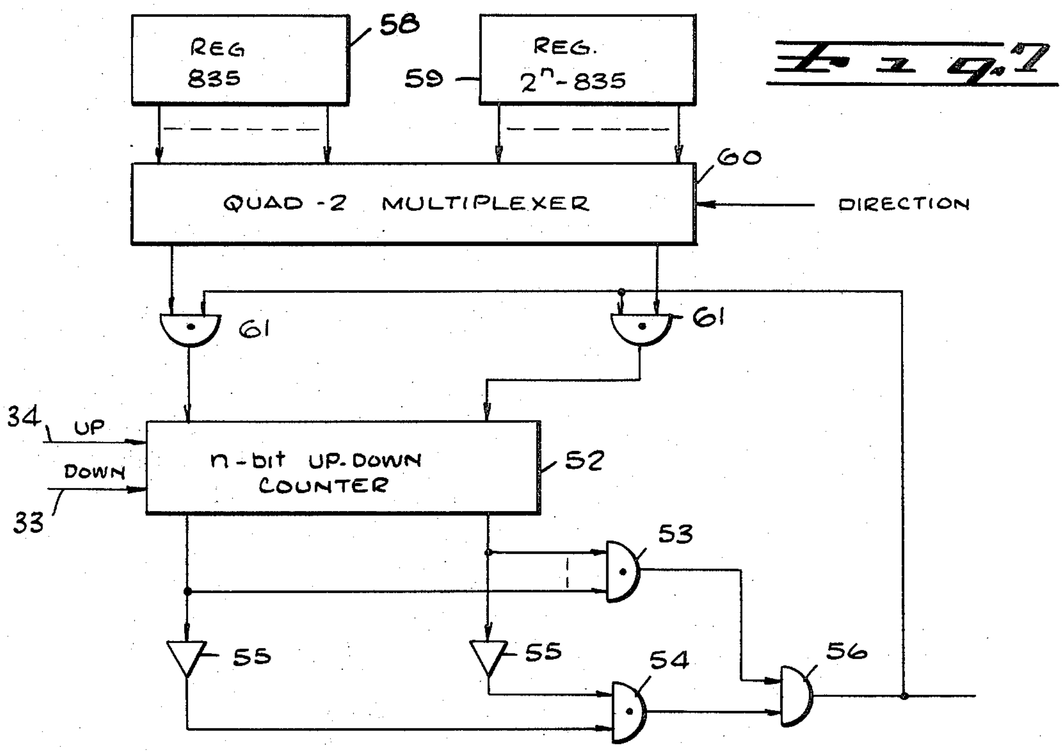
FIGS. 7 and 8 are block diagrams of two generators shown in FIG. 3.

As is appreciated by those familiar with the art different circuit configurations may be employed to perform the functions of generator 36. One exemplary configuration is shown in FIG. 7. Therein numeral 52 designates an n-bit up-down counter to which the forward and reverse pulses are supplied. The true outputs of the n stages or bits are assumed to be connected to an AND gate 53, so that when a full count is reached in counter 52 gate 53 is enabled. The n bits are also connected to an AND gate 54 through n inverters 55 so that when the count in the counter is zero gate 54 is enabled. Gates 53 and 54 are ORed together by OR gate 56, which provides the track pulse when either of gates 53 or 54 is enabled. The resetting of the counter 52 to a count of 835 or $2^n - 835$ may be achieved by including a register 58 which permanently stores a binary number of 835 and a register 59 which stores the binary number $2^n - 835$. The outputs of the two registers are connected to a Quad-2 multiplexer 60 which supplies the content of one of the registers depending in the direction signal from the control unit 25. The n outputs of the Quad-2 multiplexer are supplied to a AND gate 61 which are enabled by the track pulse. Thus, when a track pulse is produced the counter 52 is loaded with a number which depends on the direction in which the head has to move to the next track position.

Figure 8:
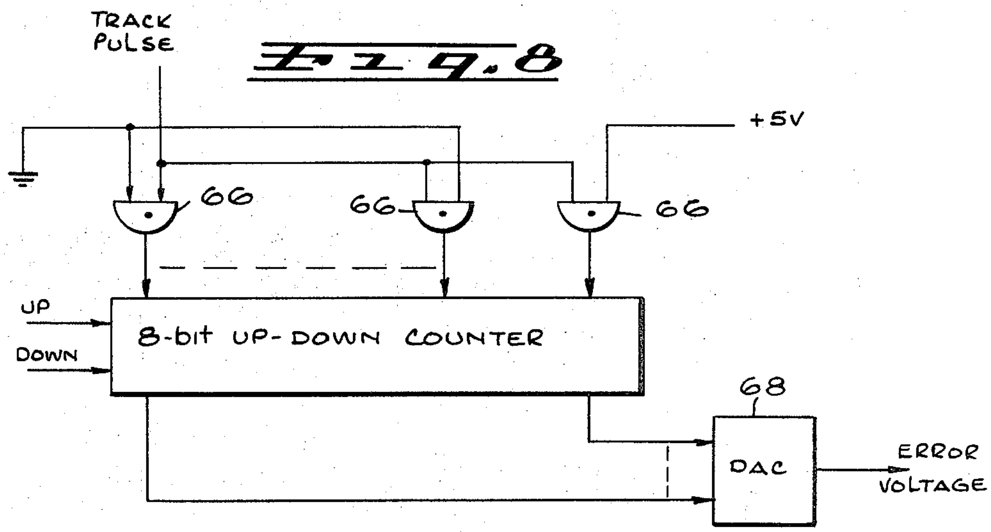

FIG. 8 is a simplified block diagram of the detent error generator 38. It includes an 8-bit up-down counter 65 to which the reverse and forward pulses from laser unit 30 are supplied. It also includes 8 AND gates 66 which are enabled by the track pulse. Seven of the gates connected to all the bits except the highest order one have one input connected to ground, while the eighth gate, connected to the highest order bit, has one input connected to a reference voltage, e.g., +5V. Thus, when the track pulse is received it enables gates 66 thereby connecting seven of the stages to ground to reset them to zero. However, the highest order bit or stage is reset to a 1, so that the 8-bit output of the counter is 128 in binary representation. The 8 bits of the counter are fed to a bipolar binary digital to analog converter (DAC) 68 which provides the error voltage as a function of the count in the counter 65. As seen from FIG. 2, when the count in counter 65 is 128, the error voltage is zero, it is a positive voltage when the count is less than 128 and is a negative voltage when the count is greater than 128. The magnitude of the voltage is directly related to the deviations of the count from 128.

It should be appreciated that for the performance of the present invention the first track position has to be established as a reference position. This may be achieved by using the head's actual position as the reference position from which all subsequent positions are spaced. In practice, however, a specific position is used as the reference position. For example, if P9 (FIG. 3) is to serve as the reference position, a transducer 70 may be embedded in support 12 so that when head is exactly at P9, an element 72 supported by carriage 10 activates the transducer to provide an electronic detent pulse. Once this pulse is produced it can be used in the system as a track pulse to load counter 52 (see FIG. 7) with the necessary number needed to define the next position.

For maximum precision, upon receiving the electronic detent pulse, the carriage 10 may be locked temporarily to support 12 by a mechanical detent 74, consisting of a plunger 75 which extends into a hole 76. When so locked, the head is exactly at P9. At this position the counter 52 is reset to define the track distance to the next position, i.e., P8, and thereafter the plunger 75 is retracted and the system enters its normal mode of operation, as previously described. That is, the error voltage is applied to the amplifiers 22 to keep the head as close as possible to P9 until the system is commanded to move the head to P8.

Figure 9:
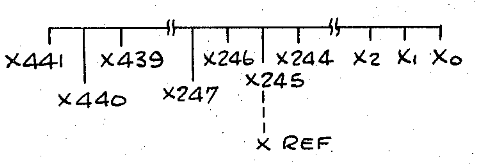
FIG. 9 is another simple diagram useful in explaining a particular application of the system of the present invention.

In one application the system is used to sequentially record data in each of 442 tracks whose centers are accurately spaced by the system so that the distance between adjacent tracks corresponds exactly to 835 pulses. Some of the 442 tracks are diagrammed in FIG. 9, by the letter X followed by a numeral. In this particular application X245 acts as the reference position XRef. Under the control of the computer 26 the carriage 10 is moved continuously until the electronic transducer 70 produces a pulse. Then, following a fixed time interval the mechanical detent 70 is activated. In this carriage position the head 16 is exactly at X245. Thus, counter 52 is reset. The next direction of travel is to the left, i.e., the forward direction. Therefore, the counter 52 is loaded with a number $2^{12} - 835$ since in the particular application counter 52 is of 12 stages ($n$=12). The difference counter 50 (FIG. 6) is loaded with a number 196. Consequently, when the carriage moves to the left the motion is continuous until position X441 is reached, since the number of tracks distance between X441 and X245 is 196.

When X441 is reached, counter is loaded with the number 835 and the difference counter is loaded with a one. After servoing the head at X441, data is recorded thereat. Then, the computer commands the system to move the head to X440 which is reached when the track pulse from counter 52 and the control signal from difference counter 50 are provided. Again, the counters 52 and 50 are loaded with 835 and 1 respectively, and after the head is servoed at X440, data is recorded thereat. This procedure is repeated until data is recorded in each of the 442 tracks.

Summarizing the foregoing description, in accordance with the present invention and up/down main counter is provided which is reset to a selected count when an element, e.g., a magnetic head, is at a first precise position. The count represents the distance to a second position at which the head will have to be positioned. As the head position deviates from the first position pulses which are produced control an error generator to provide an error voltage to servo the head to the first position. These pulses affect the count in the main counter so that when the head is commanded to move to the second position a track pulse is produced when the head reaches the second position which is at a precise distance from the first position rather than from its previous position near the first position. Such a system insures that the distances between successive positions are accurately defined, even though at each position the head's position may deviate therefrom.

Although particular embodiments of the invention have been described, it should be apparent that modifications may be introduced without departing from the spirit of the invention. For example, if desired, difference counter 50 (FIG. 6) may be eliminated and counter 52 in track pulse generator 36 may be reset to any desired number which would be a function of the number of successive tracks or positions which would be traversed before a next track pulse is produced. Also, the resetting of counter 52 which forms part of generator 36 may be accomplished in ways other than herebefore described. For example, under program or logic control the counter may be reset to any number for the desired distance of travel dynamically and independently prior to each positioning. This provides a means of successively positioning an element at positions where the distances between successive positions are independent of one another, rather than equally spaced, as herebefore generally described.

Furthermore, different types of up/down counters may be employed in the implementation of generator 36. For example, integrated circuit (IC) up/down counters which provide carry and borrow output signals may be cascaded to provide the n-bit counter 52. The carry and borrow output signals from the last stage can be used to indicate when the counter is full and empty respectively. These signals can be used to provide the track pulse and to reset the counter therewith as herebefore described.

In addition, various techniques may be used to minimize the positioning error due to inadequacy of the servo amplifiers or mechanical hysteresis. For example, the up/down counter 65 (FIG. 8) of the detent error generator 38 may be initially reset by a controller or computer to a number corresponding to zero error voltage. After settling of the element or head, its deviation from the desired position can be determined. Any deviation or positioning error can be minimized by supplying the counter 65 with a count which will cause the generator 38 to generate a voltage which will minimize the positioning error.

The foregoing described modifications are only a few which may occur to those familiar with the art. Therefore, all such modifications and equivalents are deemed to fall within the scope of the invention as defined in the following claims.

What is claimed is:

1. A servo system for controlling a member to be sequentially positioned along each of a plurality of positions comprising:

first means for moving said member in either a first direction or a second direction;

second means for providing a first pulse each time said first member moves a fixed distance in said first direction and a second pulse each time said first member moves said fixed distance in said second direction;

a first up/down counter responsive to said first and second pulses for incrementing the count therein with each first pulse and for decrementing the count therein with each second pulse, said first counter providing a position-indicating pulse when the count therein is n, indicating that said first member is at one of said positions;

third means responsive to said position-indicating pulse for resetting said first counter when said first member is at a first position of said sequence to a count $p$, $p$ being a function of said fixed distance and the absolute distance between said first position and a second position;

fourth means including a second up/down counter which is responsive to said first and second pulses and which is resettable to a preselected count $x$ by said third means in response to said position-indicating pulse for generating an error signal as a function of the deviation of the count in said second counter from $x$, said first means being responsive to said error signal for minimizing the deviation of said first member from said first position by moving said first member in said first and second directions about said first position so as to minimize the magnitude of said error signal, with said first counter being responsive to the first and second pulses produced as the deviation of said first member from said first position is minimized whereby the count therein varies from $p$; and control means for activating said first means to move said first member to said second position with said counter providing said position-indicating pulse when said first member is exactly at said second position.

2. A system as described in claim 1 wherein said second means include a mirror, means for coupling said mirror to said first member and a fixedly positioned laser means for directing a beam of light to said mirror, said beam being reflected back to said laser means, with said laser means providing said first pulse when said mirror moves said fixed distance toward said laser means and said second pulse when said mirror moves said fixed distance away from said laser means.

3. A system as described in claim 1 wherein n represents a zero count or a full count of said first counter.

4. A system as described in claim 3 wherein said first counter is a z-bit counter and p is a function of said fixed distance, the absolute distance between said first and second positions and the relative position of said second position with respect to said first position.

5. A system described in claim 4 wherein $p = 2^z - W$, wherein W is substantially equal to the absolute distance between said first and second positions divided by said fixed distance, when said first member moves in said first direction from said first position to said second position, and wherein $p = W$ when said first member moves in said second direction from said first position to said second position.

6. A system as described in claim 5 wherein said second means include a mirror, means for coupling said mirror to said first member and a fixedly positioned laser means for directing a beam of light to said mirror, said beam being reflected back to said laser means, with said laser means providing said first pulse when said mirror moves said fixed distance toward said laser means, and said second pulse when said mirror moves said fixed distance away from said laser means.

7. A system as described in claim 1 wherein said first member is a magnetic transducer and said line is a straight line on a magnetized surface, and said positions represent centers of information-containing magnetized tracks.

8. A system as described in claim 7 wherein said first member is a magnetic transducer, said line is a straight radial line on the surface of a circular magnetic disc and said positions represent the centers of concentric magnetized tracks at different radial distances from the center of said disc.

9. A positioning system for defining a sequence of accurately spaced positions of a moveable element, comprising:

first means for moving said element in either a first direction or a second direction, opposite said first direction;

second means for storing variable distance-defining information;

third means for defining the element's position as a first position in said sequence, and for storing in said second means information related to the exact distance between said first position and a second position in said sequence, with said information varying as said element deviates from said first position; and fourth means responsive to the information contained in said second means for providing a pulse, indicating the arrival of said element at said second position, when the information in said second means is varied by a preselected factor.

10. A system as described in claim 9 further including fifth means responsive to the pulse, indicating the arrival of said element at said second position, for sensing the deviation of the element's position thereof and for activating said first means to minimize said deviation.

11. A system as recited in claim 10 wherein said second means is a first counter, said information is a number, and said first means include means which provide pulses as said element is moved, said pulses varying the number in said counter, the number being a function of the distance between the element's actual position and the second position at which it is to be positioned.

12. A system as recited in claim 11 wherein said means in said first means provide a first pulse each time said element traverses a fixed distance in said first direction and a second pulse each time said element traverses said fixed distance in said second direction, said first pulse incrementing the number in said first counter and said second pulse decrementing the number in said first counter, said first counter being controlled to contain a selected number when said element is at said first position, said selected number being a function of said fixed distance and the exact distance between said first and second positions, said fourth means providing the pulse, indicating the arrival at said second position, when the number in said first counter reaches a preselected value.

13. A method of controlling a member to be sequentially positioned at each of a plurality of positions, the steps comprising:

providing a first pulse each time said first member moves a fixed distance in a first direction and a second pulse each time said first member moves said fixed distance in a second direction;

setting a first counter when the first member is exactly at a first position in said sequence to a count which is a function of said fixed distance and the distance between said first position and a second position in said sequence;

moving the first member in said first direction to said second position;

supplying said first pulses to said first counter as said first member is moved forward said second position to thereby vary the count therein;

providing a position-indicating pulse when the count in the counter reaches a preselected value;

upon receiving said position-indicating pulse resetting said first counter to a count which is a function of said fixed distance and the distance between said second position and a third position, and resetting an error counter which is supplied with said first and second pulses to a selected count to provide an error signal indicating an error in the position of said member with respect to said second position;

utilizing said error signal to minimize the deviation of the position of said member from said second position, with the count in said first counter varying from the count set therein by the first and second pulses supplied thereto when said deviation is minimized, whereby when the member is moved to the third position a position-indicating pulse corresponding to said third position is produced by said first counter after said member is moved a distance corresponding to the absolute distance between said second and third positions plus or minus the distance deviation of said member from said second position at the instant said member is moved toward said third position.

14. In a positioning servo system the arrangement comprising:

first means for moving an element to be successively positioned at each of a plurality of positions in either a first direction or a second opposite direction;

second means for providing first and second pulses each time said element moves a fixed distance in said first and second directions respectively;

third means including a first counter and means for supplying said first and second pulses to said counter to vary the count therein;

fourth means for resetting said first counter at the instant said elements is at one of said position to a selected count which is a function of the fixed distance, the distance between the position at which the element is positioned and a subsequent position at which the element is to be positioned;

fifth means coupled to said third means for providing a position pulse indicating the arrival of said element at said subsequent position when the count in said first counter reaches a selected value;

sixth means for supplying said position pulse to said third means to reset said first counter to a count which is a function of the fixed distance, and the distance between said subsequent position and a next position at which the element is to be positioned; and seventh means responsive to said position pulse for minimizing the deviation of the element's position for each of said positions.

15. In a positioning servo system as described in claim 14 wherein said second means includes a laser interferometer.

16. In a positioning servo system as described in claim 14 wherein said first counter is an up/down counter of $z$ bits, and wherein each first pulse increments the count therein and each second pulse decrements the count therein.

17. In a positioning servo system as described in claim 16 wherein said fourth means reset said first counter to a first selected count when the element is to be moved to the next position in said first direction and to a second selected count when the element is to be moved to the next position in said second direction.

18. In a positioning servo system as described in claim 17 wherein said seventh means includes a second counter responsive to said first and second pulses, and means providing an error signal which is a function of the deviation of the count in said second counter from a preselected count.

19. In a positioning servo system as described in claim 18 wherein said seventh means includes means responsive to said position pulse for resetting said second counter to said preselected count.

20. In a positioning servo system as described in claim 19 wherein said second means includes a laser interferometer.

21. A method of sequentially positioning a movable element at each of a plurality of positions precisely spaced from one another, the steps comprising:

producing a first pulse each time said element moves a fixed distance in a first direction and a second pulse each time said element moves said fixed distance in a second direction;

defining a first selected count when said element is precisely at a first position, the selected count being a function of said fixed distance and the precise distance between said first position and a second position at which the element is to be positioned; and the direction of element travel from said first position to said second position;

varying the selected count as said element deviates from said first position and as it moves toward said second position;

providing a position pulse when said count changes by a preselected numerical value, indicating the arrival of said element at said second position; and utilizing said position pulse to minimize the deviation of said element from said second position and to define a second selected count which is a function of said fixed distance, the precise distance between said second position and a third position and the direction of element travel from said second position to said third position.

22. The method as recited in claim 21 wherein said first selected count is of a first value or a second value when the direction of travel between said first position to said second position is either said first direction or said second direction respectively, and said position pulse is produced when the count value reaches either of two numerical values.

23. The method as recited in claim 22 wherein said two numerical values are a zero numerical value and a maximum numerical value.

24. The method as recited in claim 22 wherein the count is defined in a $z$-bit counter which is incremented by one by each first pulse and is decremented by one by each second pulse, the counter being reset at each position to either $2^z$—W or to W if the direction of travel to the next position is either said first direction or said second direction, respectively, and said two numerical values are zero and a maximum count value.

* * * * *